2,818,513

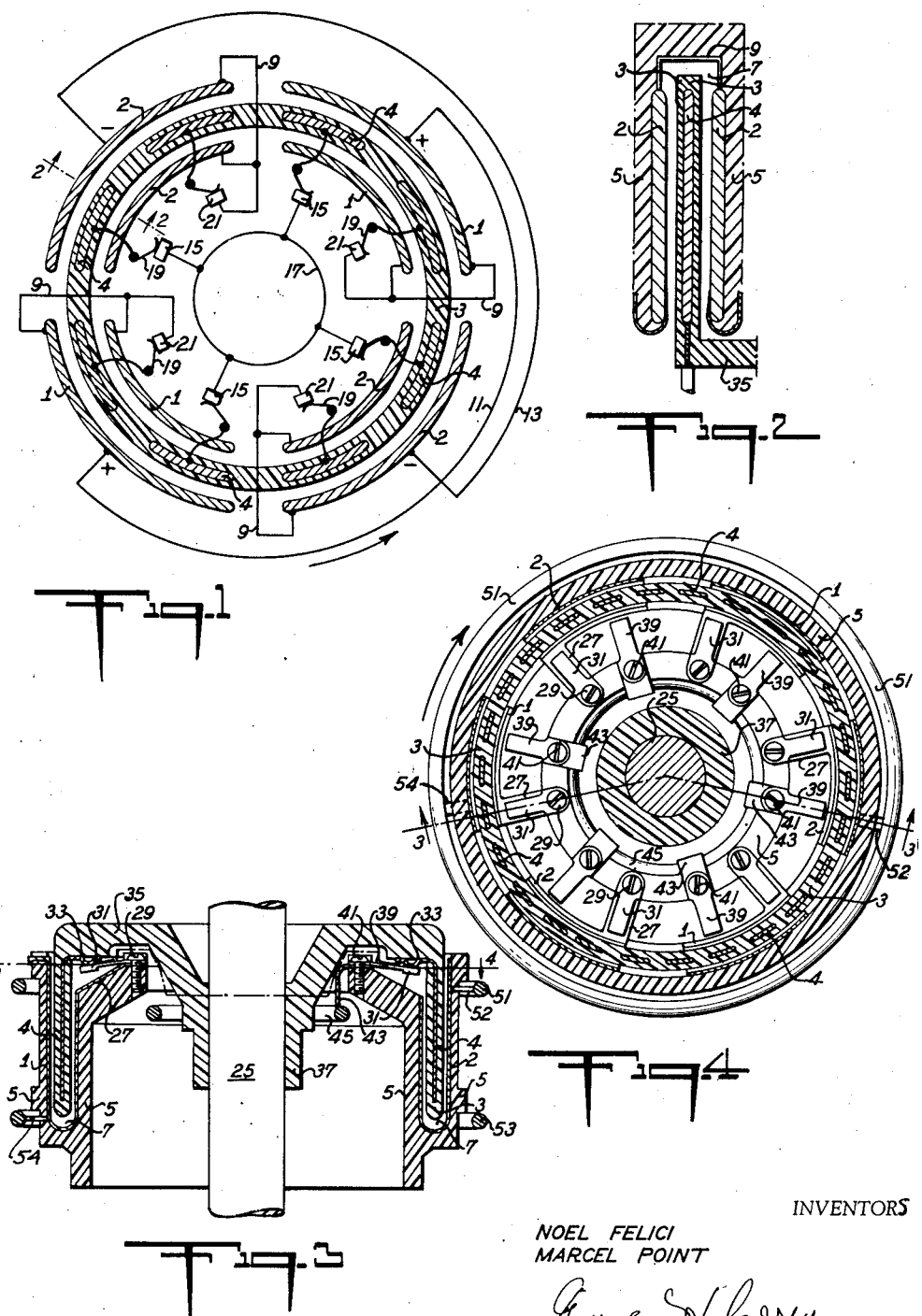
Dec. 31, 1957    N. FELICI ET AL    2,818,513
ELECTROSTATIC GENERATOR CAPABLE OF RAPID
BUILD-UP OF POTENTIAL
Filed March 7, 1955
INVENTORS
NOEL FELICI
MARCEL POINT
BY *George H. Cory*
ATTORNEY

United States Patent Office 2,818,513
Patented Dec. 31, 1957

ELECTROSTATIC GENERATOR CAPABLE OF RAPID BUILD-UP OF POTENTIAL

Noel Felici and Marcel Point, Grenoble, France, assignors to Societe Anonyme de Machines Electrostatiques, Grenoble, France, a corporation of France Application March 7, 1955, Serial No. 492,495

Claims priority, application France March 8, 1954

21 Claims. (Cl. 310—6)

The invention relates to an electrostatic machine which is capable of rapidly developing a predetermined potential. The invention more especially relates to an electrostatic machine of the type which utilizes a conductive inductor member and a conductive conveyor member movable relative to each other into and out of inductive relation to each other for developing the charge carried by the conveyor and increasing the potential thereof.

The invention particularly relates to an electrostatic generator of this type which is capable of rapid build-up of potential for charging the exciting electrodes of an electrostatic generator requiring for its operation the existence of an electrostatic field between these electrodes.

The invention will be described in an embodiment thereof which is particularly adapted for the excitation of an electrostatic generator utilizing a conveyor of insulating material supported in relation to an exciting or charging inductor member and an ionizing element in opposed spaced relation to this inductor member for movement of the conveyor member and the ionizing element with respect to each other with the conveyor disposed between the inductor member and the ionizing element. The conveyor member in the form of a wall of insulating material thus moving between the inductor member and the ionizer moves through the field which is produced in the space between the inductor member and the ionizing element when, having regard to the character of the dielectric material in this space, usually a gas, a potential difference is developed between the inductor member and the ionizing element sufficient to effect ionization of the gaseous material in this space. The ions thus developed are conducted across the ionized space to the surface of the conveyor wall and are carried thereby in the movement of the conveyor to a suitable collecting means which may comprise a second ionizing element connected to a load terminal of the machine. Preferably a second inductor member is disposed in opposed relation to said ionizing element at the opposite side of the wall therefrom to act as a screen for facilitating the collection of the charge from the conveyor and the delivery thereof to the load terminal.

In such a machine utilizing a conveyor of insulating material and electrodes spaced from the respective surfaces thereof, it is necessary in order to start the machine in operation that the required potential difference first shall be developed between the exciting inductor member and the exciting ionizing element. Because the gaseous material is not conductive until ionization thereof is effected, such an electrostatic generator is not self-priming or self-starting. Auxiliary means which may be provided, for example, by a radioactive body, as disclosed in the application of Roger Morel, Serial No. 465,395, filed October 28, 1954, therefore, must be used. Various types of auxiliary devices, including frictional generating machines, may be utilized.

In accordance with the invention an electrostatic generator capable of rapid build-up of its potential is proposed which may be connected to the exciter electrodes of an electrostatic generator having an insulating conveyor for excitation thereof. This priming or starting electrostatic generator is constructed with a conductive inductor member and also with a conductive conveyor member which are moved relative to each other into and out of inductive relation to each other. In such a machine, and particularly in one constructed in accordance with the invention in the manner to be described, because of residual charges on the conductive elements and having regard to the disposition of these elements in greater or less proximity to bodies which themselves are charged, the build-up of the potential at the output or load terminal of the machine may be started upon initiating and continuing the relative movement of the inductor and the conveyor members with respect to each other, conductive connections being provided between the conveyor and the load terminal so that the charge at the developed potential carried by the conveyor may be delivered to the load terminal during the initial movement of the conveyor and the inductor relative to each other. The rapidity of the build-up of the potential in such a machine is a function of the inherent capability of the machine to develop a charge in suitable amount at a sufficiently elevated potential. This rapidity is greater according as the capacity which it necessary to charge in order to obtain the desired potential is reduced.

It is an object of the invention to provide a machine capable of rapid build-up of potential and of furnishing charges at this potential in the desired amounts.

It is another object of the invention to provide a machine providing rapid build-up of potential suitable for charging and exciting an electrostatic generator having a conveyor of insulating material.

It is a further object of the invention to provide an electrostatic machine capable of rapid build-up of potential and constructed so as to occupy a small space and of such restricted dimensions that it does not increase materially the space necessary for the electrostatic generator with which it is associated to produce the priming or starting excitation thereof.

It is an additional object of the invention to provide an electrostatic generator utilizing conductive inductors and conductive conveyor members in which the conveyor members are to a high degree influenced only by the inductor members and the effect of stray capacities is minimized.

It is an important object of the invention to provide an electrostatic generator of this type suitable for exciting an exciter generator having a conveyor of insulating material which is connected to and excites a main generator constructed for ignition of internal combustion engines, particularly automotive engines.

It is a feature of the invention that provision is made to take advantage to the maximum possible of the volume of the dielectric material, including a gas under pressure, which serves to insulate the conductive inductor members and the conductive conveyor members both from each other and from the surrounding and supporting parts and to accomplish this purpose in a machine which is of simple and inexpensive construction. These purposes are accomplished by constructing a machine with a plurality of inductor members, having regard to the requisite insulation of these members at their potentials, so as to increase the number of cycles of commutation accomplished in each cycle of movement of the conveyors. In a practical machine ordinarily these inductor members will be disposed about an axis of rotation about which the conductive conveyor members are rotated in succession into and out of inductive relation to the inductor members in succession.

The cycle of commutation may be carried out with reversal of the polarity of the charge carried by the conveyor when in inductive relation to two different inductor members at different potentials and carrying charges of opposite polarity. These inductor members may be at potentials respectively above and below ground potential. This commutation, however, may be carried out relative to a reference potential which itself may be above or below ground potential. In the latter case, within the scope of the invention one or the other of the inductor members may be at ground potential.

Another feature of the invention serves to secure the desired rapid build-up and to add to the effect of the dielectric fluid in which the inductive parts operate relates to the disposition of the inductor members in face to face relation to two faces of the conveyors in order to increase the useful capacity of these conveyors with respect to the inductors and to diminish the parasite capacities existing between the conveyors and charged bodies other than the inductor members themselves. Especially in a machine of this type in which the conveyor members are disposed in spaced relation about an axis of rotation, the inductor members also being spaced about this axis, since these inductor members and conveyor members are movable into and out of inductive relation to each other by rotation of the conveyor members on the axis and since the inductor members have portions thereof disposed at both faces of the conveyor members, the conveyor members move through the space between these portions which are effective to shield the conveyor members from parasite capacities throughout a very large part of the rotation of each conveyor member about the axis of rotation.

To further aid in reducing the effect of the parasite capacities and make more effective the inductive action of the inductor members with respect to the conveyor members, these conveyors in the electrostatic generator of the invention are partially or entirely covered with a solid insulating matrial. Such insulating covering avoids the necessity of providing on each conveyor and on each surface thereof a highly polished surface. Such covering may be accomplished by disposing the conveyor members in spaced relation to each other about the axis of rotation and entirely within the material of the wall of insulating material of a rotor which is co-axial with and rotatable on the axis of rotation. When so covered, either partially or completely, by the insulating material of the rotor, the space between the rotor carrying the conveyor members and the stator supporting the inductor members may be reduced, thereby increasing the useful capacity between the conveyor members and the inductor members while reducing or eliminating the risk of electrical discharge taking place between these members. The maximum benefit thus may be obtained of the dielectric strength of the dielectric fluid, ordinarily a gas under pressure, that separates the inductive parts that are movable relative to each other. The increase of the useful capacity, moreover, decreases the relative influence of the parasite capacities, that is to say, capacities existing between the conveyor and inductive parts other than the inductors.

The machine of the invention is constructed so that the dimensions of the conveyors and of the inductors, especially the relative dimensions that are parallel to the path of movement of the conveyors with respect to the inductors, provide that a plurality of the conveyor members in the movement thereof between the portions of the inductor members are disposed in face to face relation to each inductor member. The inductor member has an extent parallel to the path of movement, particularly an arcuate extent about the axis of rotation of the rotor, which is greater than the extent parallel to the path of movement or to the arcuate extent of a plurality of the conveyor members and the space or spaces therebetween.

Since in the preferred embodiment, as hereinafter further described, a conveyor is connected to each inductor as the conveyor and this inductor come into face to face inductive relation to each other and the same conveyor is connected to a reference potential as this conveyor and the inductor are moved out of inductive relation to each other, each conveyor may be shielded by the inductor when this inductor is of suitable form and the effective capacity between the conveyor and the other members of the machine, except the inductor, may be maintained as small as possible.

In the machine of the invention the charge carried by the conveyor as the conveyor leaves inductive relation to a given inductor is increased in potential and is delivered to the next inductor member which may be connected to one of the terminals of the load circuit. The capacity to be charged exclusive of that of the load circuit is constituted by all bodies which emit lines of force toward the respective inductors or receive lines of force from these inductors. It is important, in order to accelerate the build-up of potential with concomitant ability of the machine to discharge a sufficient amount of charge, that the capacity to be charged shall be diminished as much as possible. This purpose may be accomplished by utilizing one or more of the means about to be described.

The inductors of the machine are disposed as far as possible from all members which constitute parasite capacities, such as members which are grounded, and the adjacent inductors, and all other bodies which are carried at a potential different from that of the particular inductor except, of course, the conveyors which are in face to face inductive relation to this inductor. This purpose is further accomplished by providing a large number of conveyors of reduced dimension, particularly in the direction parallel to the path of movement of circumferentially about the axis of rotation so as to reduce the capacity of each conveyor with respect to the stray capacities and to reduce the number of lines of force between each conveyor and the inductors. Thus, in a given length of the path of movement of the conveyors with respect to the inductor members, or in a given rotation of a rotor carrying the conveyors and moving the conveyors into and out of inductive relation to the inductor members in succession, a large number of conveyors are successively brought into inductive relation to each inductor. In such movement into inductive relation with an inductor each conveyor of small dimension is connected to such inductor. A large number of cycles of charge and discharge of the conveyor elements in a given period of time thus is made possible and the required increase of potential and the desired build-up of charge on the respective inductors are accomplished.

In order to accomplish the charging of the conveyor elements at a given potential and the build-up of potential and discharging of these conveyor elements to inductors that are at a different potential, a plurality of sets of inductors are disposed along the path of movement or about the axis of rotation of the rotor. These sets of inductors operate at different potentials. They operate at opposite polarities and at potentials which may be symmetrical with respect to ground potential, or one or the other sets of inductors may be connected to a reference potential or to ground potential and the other set may operate at a potential above or below the reference or ground potential. Where the reference potential is ground potential the conveyor, as it is about to leave face to face relation to a given inductor, is connected to ground, thereby undergoing an abrupt change of polarity. In moving into inductive relation to the next inductor, this conveyor at ground potential and carrying a positive or a negative charge, as the case may be depending on the charge of the inductor which the conveyor is about to leave, increases in potential and the charge conveyed is discharged to this next inductor at opposite polarity from the first inductor. While this general arrangement of inductors and conveyors has been disclosed in the application of Felici, Morel and Point, Serial No. 390,346, filed November 5, 1953, it is utilized in the electrostatic generator of the invention in connection with the construction above referred to which secures the conditions outlined above which make possible the rapid build-up of potential and charge which are particularly desirable for exciting a generator having an insulating conveyor.

The invention will be described more particularly in connection with the drawings in which:

Fig. 1 shows diagrammatically the cross section of a machine embodying the invention.

Fig. 2 shows diagrammatically a typical section on line 2—2 of Fig. 1.

Fig. 3 shows a longitudinal section of a rotary machine embodying the invention.

Fig. 4 shows a section of line 4—4 of Fig. 3.

In Fig. 1 a plurality of sets of arcuate inductor members, two sets in the embodiment disclosed, are disposed in interspersed spaced relation about an axis of rotation. A set comprising inductors 1 is disposed on a diameter through the axis. The interspersed set comprising inductors 2 is disposed on a diameter at right angles to the diameter of set 1. The inductors 1 and 2 of the respective sets each are composed of two portions disposed at opposite sides of the wall 3 of a hollow rotor, Fig. 2, the wall 3 being supported by a web 35 for rotation on the axis of rotation so as to move the wall 3 through the space between the two portions of each inductor member and in spaced relation to these portions.

The rotor 3 is of insulating material and carries conveyor members 4 of conductive material. In the embodiment disclosed in Figs. 1 and 2 eight conveyor members are disposed in spaced relation about the axis of rotation. These conveyor members are of arcuate form circumferentially about the axis of rotation and are embedded in the insulating material of the wall 3 so that all surfaces of the conveyor members are covered by the insulating material of the wall. The arcuate extent and the spacing of the conveyor members from each other is such that a plurality of the conveyor members are disposed between the two portions of each inductor member in the position of the rotor when the conveyor members respectively are being discharged to the inductor member and are being charged with a charge opposite in polarity to that of this inductor to be conveyed to the adjacent inductor member in the manner generally referred to above upon rotation of the rotor 3 in the direction of the arrow, Fig. 1.

As shown in Fig. 2, the inductor members 2 are supported by an insulating stator 5 in which is formed a recess 7, the two portions of the inductor 2 being disposed at the opposed faces of the recess which extend along and generally parallel to the wall 3 of the motor which carries the conveyor members 4. Preferably the rotor wall 3 is of hollow cylindrical form about the axis of rotation and with the web 35 is of bell shape, Fig. 2, and the recess 7 is formed as a continuous annular cylindrical recess in the stator 5, so that the rotor wall 3 may be rotated within this space between the two portions of the inductor member 2. It will be understood that the section of Fig. 2 taken through inductor 2 in Fig. 1 is typical of the arrangement also of the portions of the other inductor 2 and of each inductor member of set 1; also that the rotor 3 and the conveyors 4 in the rotation thereof become disposed in the different positions in relation to the two portions of each other inductor member, as shown in Figs. 1 and 2 and above described.

The two portions of each inductor shown diagrammatically in Fig. 1 are electrically connected together by connections 9, so that these two portions will be at the same polarity and potential. In this embodiment also the two inductor members of each set are electrically connected together by the respective connections 11 and 13. The inductors 1 are assumed to be at positive potential and the inductors 2 are assumed to be at negative potential but may be at other potentials and polarities.

Disposed in spaced relation about the axis of rotation are studs or fixed contacts 15, Fig. 1, which are connection to a conductive ring 17 which may be connected to ground, as the reference potential. Spring contacts 19 are supported by the rotor in any suitable manner so that these contacts frictionally engage the fixed contacts 15 as the rotor rotates, the contacts 19 respectively being electrically connected to the conveyor members 4. The fixed contacts 15 are so disposed about the axis of rotation with respect to the positions of the inductor members 1, 2 about this axis that, as a conveyor member 4 rotating in the direction of the arrow is about to leave inductive relation to an inductor member but is still at least partially, and preferably is fully, in inductive relation to this inductor member, the spring contact 19 connected to this conveyor member engages the fixed contact 15 associated with this inductor member. The charge carried by the conveyor moving between the two portions of this inductor member before contact 19 reaches contact 15 is at the same potential and polarity as that of this inductor member. This polarity of the conveyor is abruptly changed when the spring contact 19 engages the fixed contact 15. If the charge on the conveyor is at a plus potential, this charge will be transferred to ground and the conveyor will receive a negative charge from ground which will be retained upon the conveyor when, upon further rotation of the rotor in the direction of the arrow, Fig. 1, contact of the spring contact 19 with the fixed contact 15 is broken.

The negative charge now carried by this conveyor, increasing in potential as the conveyor moves out from between the two portions of the positively charged inductor is delivered to the next adjacent inductor member which is at a negative potential when this conveyor member becomes disposed between the two portions of this adjacent inductor member. This is accomplished by engagement of the spring contact 19 connected to this conveyor with a fixed stud or contact 21 disposed for such engagement and connected to the two electrically connected portions of this adjacent inductor member at negative potential. A plurality of such fixed contacts 21 is disposed, as shown in Fig. 1, in interspersed relation to the fixed contacts 15 and in proper relation to the respective inductor members about the axis of rotation, so that each conveyor member which is charged at a given polarity as it leaves a given inductor member is discharged to the next inductor member at the same polarity as the conveyor member when this conveyor member moves into inductive relation to this adjacent inductor member. When the spring contact 19 is disengaged from the fixed contact 21, while the conveyor member is moving between the two portions of the inductor member at the same polarity and potential, the charge is retained on the conveyor and is discharged therefrom and a charge of opposite polarity is received by the conveyor when the spring contact engages the fixed contact 15 as this conveyor is about to move out of inductive relation to this same inductor as above mentioned.

The action which has been described takes place with respect to each inductor member for each conveyor member. Alternate inductor members thereby become charged at opposite polarities, each set of inductor members in cooperation with the conveyor members constituting the exciting means for the other set of inductor members cooperating with the conveyor members. In the particular embodiment disclosed in Figs. 1 and 2, the generator generates a difference of potential of predetermined amount between the negatively charged inductors and the positively charged inductors, these connected inductor members of the two sets of inductor members constituting the terminals of the machine. It will be understood, however, that the potential and polarity of the ring 17 and the contacts 15 connected thereto may be determined above or below ground potential, the potentials and polarities of the two sets of inductor members being correspondingly determined so that the potential of the ring 17 and the contacts 15 is intermediate between the potentials of the two sets of inductor members.

In order to meet the condition that the charge carried by the conveyor shall not be dissipated by sparking to an adjacent conductive body, it is desirable to dispose the contacts 21 in such a manner that each conveyor is discharged to the respective inductors as soon as the conveyor has attained a potential approximating that of the inductor into inductive relation to which the conveyor is moving and to provide that the contacts 19 shall not be disengaged from the fixed contacts 21 before the conveyors are fully in face to face relation to the respective inductors.

When the machine has never been operated or has been idle for a considerable time, the residual difference of potential between the members, even though not very great, is sufficient in the machine of the invention for building up the potential and the charge.

The features which have been described generally in connection with Figs. 1 and 2 are embodied in a machine of practical form as shown in Figs. 3 and 4. In these four figures like parts so far as possible carry the same reference numerals. The rotor 3 is generally of the same hollow cylindrical bell shape as in Fig. 2, this rotor being supported for rotation on a shaft 25 which may be supported in suitable bearings not shown. A large number of conveyor members 4 are embedded in the wall of the rotor 3, similarly to the embodiment of Fig. 1, in spaced relation to each other about the axis of rotation of the shaft 25. The stator 5 provides a recess 7 having parallel cylindrical surfaces co-axial with the axis of the shaft 25 and this stator extends about the free end of the cylindrical wall 3 of the rotor and about the ends of the conveyors 4.

The inductors 1, 2 in the embodiment of Figs. 3 and 4 are of U shape in section in a radial plane through the axis of the shaft, the two parallel leg portions of the U extending along the opposed surfaces of the recess in the direction parallel to the axis. These inductor members, moreover, are of arcuate form with the two parallel arcuate portions extending about the axis of rotation and parallel to the wall 3 of the rotor. The conveyor members 4 may be of arcuate form or, because of their limited peripheral extent about the axis of rotation, may be more or less flat. Upon rotation of the rotor 3 the conveyors move in succession between the two leg portions of each inductor member 1, 2. In the embodiment of Figs. 3 and 4, six inductor members constituting two sets each consisting of three inductor members are provided. In this embodiment twenty-six conveyor members 4 are carried by the rotor in spaced relation to each other about the axis and are embedded in the wall 3 of the rotor. Having regard to the description of the electrostatic action given in connection with Fig. 1 to effect charging of the respective sets of inductors and the change of polarity or potential of the conveyors upon engagement with the fixed contacts 15, it will be understood that a very large number of such changes is rapidly produced in the embodiment of Figs. 3 and 4 upon rotation of the twenty-six conveyor members about the axis and passing alternately between the portions of the inductor members of the two sets 1, 2 of inductor members that are at different potentials or polarities.

In the embodiment of Figs. 3 and 4 the inductor members 1, 2 may be formed of one piece of metal bent into the U shape and as shown in section in Fig. 3. The form of these metal members may be such as to fit closely to the respective annular surfaces of the recess 7. Each inductor member is provided with a lug portion 27 which extends upon the inclined or conical surface of the stator 5 as shown in Fig. 3. The end of this lug 27 is secured by a screw 29 tapped into the stator, this screw 29 also holding in place a stationary contact 31 which is disposed generally radially and above the lug 27 for engagement with a contact connected to each conveyor member.

The contact carried by the rotor and connected to the conveyor may be formed as a lug portion 33 of the conveyor member 4 which extends inwardly with respect to the cylindrical wall 3 of the rotor and above the contact 31 in Fig. 3. This lug 33 may be disposed closely adjacent the web 35 of the rotor which is supported by the hub 37 fitted on the shaft 25.

In the space between each lug 27 of the inductors an additional stationary contact 39 is disposed and held in place by a screw 41 threaded in the insulating stator 5. This screw also holds in engagement with the contact 39 a connection 43 connecting each of the contacts 39 in common to a metal ring 45 extending about the hub 37. This metal ring may constitute a body at the reference potential, or for this purpose may, if desired, be connected to ground, so that the potentials generated by the generator may be respectively above and below ground potential.

In order to establish the alternate inductors 1, 2 at common potentials, the two sets being at different potentials, a metal ring 51 extends about the exterior of the stator 5 and is provided with connections 52 through the stator wall to alternate inductor members. A second ring 53 similarly extending about the stator and disposed in spaced relation to ring 53 along the axis is connected by connection 54 to each of the other inductor members. In accordance with the diagrammatic showing in Fig. 1, the rings 51 and 53 may constitute the terminals of the machine respectively at positive and negative potentials, or one or the other of these rings may be connected to a predetermined potential, for example, ground potential, the other constituting the other terminal of the machine at a different potential. In this case, the metal ring 45 constitutes the body at the reference potential or may be connected to a body of sufficient capacity to serve the function of supplying and receiving the charges when the contacts 33 carried by the rotor and connected to the respective conveyor members 4 are brought into engagement with the contacts 39.

The charge carried by a conveyor at the reference potential is increased in potential as the conveyor moves clockwise in Fig. 4 from one inductor to the next and is delivered at the increased potential to a contact 31 to charge this next inductor through the lug 27 which is connected to this contact. The charge carried by this conveyor when the contact 33 is disengaged from the contact 31 is retained on the conveyor in its movement between the two leg portions of the inductor, the conveyor then being insulated from any contact until the contact 33 comes into engagement with the next contact 39 that is connected to the ring 45 at reference potential. In this position of contact, the polarity of the charge carried by the conveyor is reversed if the reference potential is ground, or a corresponding change in the potential is effected if the reference potential is different from ground. The conveyor, continuing its movement out from between the leg portions of this inductor, has the charge thereon increased in potential until this conveyor is connected to the next contact 31 which is connected to the next inductor member as the conveyor enters between the legs of this next inductor member.

In the machine of the invention the increase of potential is very rapid. This result may be accomplished in a machine constructed in accordance with the embodiment of Figs. 3 and 4 in which the length of the cylindrical rotor 3 of insulating material is about 35 millimeters and the diameter thereof is 70 millimeters. In such a machine the potential may be multiplied by 30 in each revolution of the rotor for a useful capacity of 20 picofarads. In two revolutions of the rotor the initial difference of potential will be multiplied by about 900. This multiplication of potential proceeds until the operating potential of the machine is reached in view of the capacities provided by the inductors and conveyors, the effect of the parasite capacities and the effectiveness of the dielectric gas, preferably at a pressure of several atmospheres, and the effectiveness of the insulation of the rotor 3 enrobing the conveyors 4.

As above indicated, when the reference potential is ground potential, which may be established when the ring 45 is connected to ground, the two terminals respectively connected to the two sets of inductors supply two symmetrical potentials $+U$ and $-U$. If the interconnection provided by the ring 45 is insulated from ground and from other parts and one of the sets of inductors is connected to ground, the other inductor will supply a potential of $+2U$ or $-2U$ depending upon the polarity at which starting of the machine takes place.

The invention may be embodied in other forms of electrostatic generators than that shown in the drawings and described above. For example, a plurality of walls or a plurality of rotors for carrying the conveyors may be supported for rotation within respective recesses in an insulating stator, the inductor members having portions electrically connected and disposed at the opposed surfaces of the recesses for movement of the conveyor members in succession into inductive relation to these inductors and between the two portions.

The machine of the invention may utilize to advantage a fluid medium of high dielectric strength such as a compressed gas, for example, pure nitrogen, a mixture of nitrogen and oxygen, hydrogen or other gases. Liquid insulating materials having a high dielectric constant may be used as the dielectric material. In such cases the insulating material enrobing the conveyors preferably should have a dielectric constant equal to or greater than that of the dielectric fluid.

We claim:

1. An electrostatic generator having a rotor rotatable on an axis and providing a wall of insulating material extending about and along said axis and about a hollow space within said wall, a plurality of conductive conveyors carried by said wall in spaced relation to each other about said axis and each having an arcuate extent about said axis and each extending along said axis, a conductive inductor member having two generally parallel portions thereof each of arcuate form extending circumferentially about said axis and in spaced relation to and at opposite sides of said wall of said rotor and extending along said wall of said rotor in the direction generally along said axis, said portions of said inductor member being disposed for movement of said conveyor members therebetween in succession into and out of inductive relation to said inductor member in the rotation of said rotor on said axis, and means for connecting said conductive conveyor members in succession to a reference potential concomitantly with the movement of said conveyor members in a predetermined inductive relation to said inductor member.

2. An electrostatic generator having a rotor rotatable on an axis and providing a wall of insulating material extending about and along said axis and about a hollow space within said wall, a plurality of conductive conveyors carried by said wall in spaced relation to each other about said axis and each having an arcuate extent about said axis and each extending along said axis to provide an inductive surface on said conveyors, a conductive inductor member having two generally parallel portions thereof each of arcuate form extending circumferentially about said axis and in spaced relation to and at opposite sides of said wall of said rotor and extending along said wall of said rotor in the direction generally along said axis, said portions of said inductor member being disposed for movement of said conveyor members therebetween in succession into and out of inductive relation to said inductor member in the rotation of said rotor on said axis, means for connecting said conductive conveyor members in succession to a reference potential concomitantly with the movement of said conveyor members out of inductive relation to said inductor member, a load terminal of said generator, and means for connecting said conductive conveyor members in succession to said load terminal concomitantly with the movement of said conveyor members into inductive relation to said inductor member.

3. An electrostatic generator as defined in claim 1 which comprises a plurality of said inductor members disposed in spaced relation to each other about said axis of rotation for movement of said conductive conveyor members in succession into and out of position between said generally parallel portions of the respective inductor members in succession.

4. An electrostatic generator as defined in claim 1 in which said portions of said inductor member have an arcuate extent not less than the arcuate extent of a plurality of consecutive conveyor members and the spaces therebetween.

5. An electrostatic generator as defined in claim 1 in which said conveyor members are embedded in the insulating material of said wall of said rotor so as to cover a substantial portion of the surface of said conveyor members.

6. An electrostatic generator as defined in claim 5 in which said conveyor members are fully embedded in said insulating material of said wall of said rotor so that the insulating material covers all of the surface of said conveyor members.

7. An electrostatic generator as defined in claim 1 which comprises a plurality of said inductor members disposed in spaced relation circumferentially about said axis of rotation of said rotor, means for charging alternate inductor members at a given potential, means for charging the other inductor members at another potential different from said given potential, and means for connecting said conveyor members in succession to a reference potential intermediate between said given potential and said other potential concomitantly with movement of said conveyors in succession out of inductive relation to each inductor member.

8. An electrostatic generator comprising a rotor having a wall of insulating material extending about a hollow space within said wall and about and along an axis of rotation, means for supporting said rotor for rotation on said axis with the hollow space within said rotor open at an end thereof, a conductive inductor member having a portion supported within said hollow rotor adjacent the inner peripheral surface of said wall and a portion supported adjacent the exterior peripheral surface of said wall, a plurality of conductive conveyor members supported by said rotor wall in spaced relation to each other about said axis of rotation for movement of said conveyor members in succession into and out of inductive relation to and between said portions of said inductor member, said conveyor members each having an arcuate extent peripherally about said axis and extending along said axis, said portions of said inductor member being of arcuate form extending peripherally about and along said axis of rotation generally parallel to said wall and being electrically connected together, means for connecting said conveyor members in succession to said inductor member concomitantly with the movement of said conveyor members into inductive relation to said inductor member, and means for connecting said conductive conveyor members in succession to a reference potential concomitantly with movement of said conveyor members out of inductive relation to said inductor member.

9. An electrostatic generator as defined in claim 8 which comprises a plurality of said inductor members disposed in spaced relation to each other about said axis of rotation for movement of said conductive conveyor members in succession into and out of position between said parallel portions of the respective inductor members in succession, said means for connecting said conductive conveyor members in succession to a reference potential comprising a member at said reference potential to which each conveyor member is connected as it moves out of inductive relation to each inductor member.

10. An electrostatic generator comprising a stator of insulating material providing an annular recess having opposed peripheral surfaces co-axial with and extending along an axis of rotation from an open end of said recess, a rotor of insulating material supported for rotation on said axis and having a wall providing peripheral surfaces co-axial with and extending along said axis of rotation, said wall of said rotor projecting into said recess at said open end thereof and being disposed within said recess of said stator in spaced relation to said peripheral surfaces of said recess, a conductive inductor member supported by said stator and having a portion adjacent a given peripheral surface of said annular recess, a conductive conveyor member carried by said rotor wall for movement of said conveyor member into and out of inductive relation to said conductive inductor member upon rotation of said rotor, said portion of said inductor member having an arcuate extent along said peripheral surface of said recess and having an extent along said axis of rotation to provide an inductive surface generally parallel to said rotor wall, said conductive conveyor member having an arcuate extent about said axis of rotation substantially less than the arcuate extent of said inductor member and having an extent along said axis to provide an inductive surface generally parallel to said rotor wall, a contact carried by said rotor for rotation with said conveyor member about said axis of rotation and electrically connected to said conveyor member, a contact supported by said stator and electrically connected to a member at a reference potential and engageable with said rotatable contact upon rotation of said rotor on said axis for conducting a charge between said conveyor member and said member at said reference potential.

11. An electrostatic generator as defined in claim 10 which comprises a contact supported by said stator and connected to said conductive inductor member and engageable in the rotation of said rotor with said contact carried by said rotor connected to said conveyor member for conducting a charge between said conveyor member and said inductor member.

12. An electrostatic generator as defined in claim 10, said contact carried by said rotor and connected to said conveyor member being disposed inwardly toward said axis of rotation with respect to said rotor wall, said contact supported by said stator being supported by a portion of said stator disposed inwardly with respect to the wall of said rotor toward said axis of rotation for engagement of said stator contact with said rotor contact.

13. An electrostatic generator as defined in claim 10 in which said member at said reference potential comprises a ring extending about said axis of rotation and connected to said contact supported by said stator.

14. An electrostatic generator as defined in claim 10 in which said inductor member has a second portion electrically connected to said first portion and extending along the annular peripheral surface of said recess that is in opposed relation to said given peripheral surface of said recess, the portion of said inductor member disposed inwardly with respect to said wall of said rotor being electrically connected to a contact supported by said stator within the hollow space of said rotor for engagement in the rotation of said rotor with said contact carried by said rotor and connected to said conveyor member.

15. An electrostatic generator comprising a stator of insulating material providing an annular recess having opposed peripheral surfaces co-axial with and extending along an axis of rotation from an open end of said recess, a rotor of insulating material supported for rotation on said axis and having a wall providing peripheral surfaces co-axial with and extending along said axis of rotation, said wall of said rotor projecting into said recess from said open end thereof and being disposed within said recess of said stator in spaced relation to said peripheral surfaces of said recess, a plurality of conductive inductor members supported by said stator in spaced relation to each other about said axis of rotation, each of said inductor members being disposed within said recess and being of U shape in section in a radial plane through said axis of rotation, each of said inductor members having the leg portions of the U disposed adjacent the respective adjacent peripheral surfaces of said annular recess and with the portion connecting said leg portions extending about an end of said rotor disposed within said recess, said leg portions having an arcuate extent peripherally along the respective peripheral surfaces of said recess and an extent along said axis of rotation to provide an inductive surface of said inductor member generally parallel to said surfaces of said wall of said rotor, a plurality of conductive conveyor members carried by said rotor wall for movement of said conveyor members in succession into and out of inductive relation to said conductive inductor members in succession upon rotation of said rotor, said conductive conveyor members each having a substantial extent along said axis and an arcuate extent about said axis of rotation substantially less than the arcuate extent of each of said inductor members, a plurality of contacts carried by said rotor for rotation with said conveyor members about said axis of rotation and respectively electrically connected to said conveyor members, a plurality of contacts supported by said stator respectively electrically connected to said inductor members and disposed for engagement in succession by said contacts carried by said rotor in succession in the rotation of said rotor on said axis, and contacts carried by said stator and connected to a common member at a reference potential and disposed in positions intermediate between successive contacts connected to said inductors for alternate engagement of said contacts carried by said rotor with stator contacts connected to said inductor members and stator contacts connected to said common member.

16. An electrostatic generator as defined in claim 15, which comprises a conductive ring supported by said stator and electrically connected to alternate inductor members to establish said alternate inductor members at a common potential, and a second conductive ring supported by said stator and electrically connected to the other inductor members to establish said other inductor members at another common potential.

17. An electrostatic generator comprising a conductive conveyor supported for movement thereof in a circumferential path about an axis of rotation, said conveyor providing a surface extending along said axis and extending about said axis generally parallel to said path of movement, a plurality of conductive inductor members supported in spaced relation to each other about said axis and each having two portions respectively disposed inwardly towards said axis and outwardly from said axis with respect to said circumferential path of movement, said portions each providing a surface adjacent said path and extending along said axis and extending about said axis generally parallel to said path of movement, whereby said conveyor is rotated into and out of positions of inductive relation to said inductor members in succession between said two portions of each of said inductor members.

18. An electrostatic generator as defined in claim 17 in which the space between consecutive inductor members is not substantially greater than the minimum space required to prevent discharge between consecutive inductor members, the summation of the circumferential extents of said inductor members being substantially equal to the difference between the full circumference about said axis and the summation of said spaces between said inductor members required to prevent discharge therebetween.

19. An electrostatic generator comprising a plurality of conductive conveyors supported in spaced relation to each other along and for movement thereof in a circumferential path about an axis of rotation, said conveyors each providing a surface extending along said axis and extending about said axis generally parallel to said path of movement, a plurality of conductive inductor members supported in spaced relation to each other about said axis and each having two portions respectively disposed inwardly towards said axis and outwardly from said axis with respect to said circumferential path of movement, said portions each providing a surface adjacent said path and extending along said axis and extending about said axis generally parallel to said path of movement, whereby said conveyors in succession are rotated into and out of positions of inductive relation to said inductor members in succession between said two portions of each of said inductor members.

20. An electrostatic generator as defined in claim 19 in which the spaces between consecutive inductor members are sufficient to prevent discharge between said consecutive inductor members, the summation of the circumferential extents of said portions of said inductor members occupying the major portion of the full circumference about said axis.

21. An electrostatic generator as defined in claim 19 which comprises means for connecting said conductive conveyors in succession to a reference potential concomitantly with movement of said conveyors out of inductive relation to the respective inductor members, and means for connecting said conductive conveyors in succession to the respective inductor members concomitantly with said movement of said conveyors into inductive relation to the respective inductor members.

References Cited in the file of this patent

UNITED STATES PATENTS

| | | |
|---|---|---|
| 883,846 | Wommelsdorf | Apr. 7, 1908 |
| 2,530,193 | Felici | Nov. 14, 1950 |
| 2,610,994 | Bosch et al. | Sept. 16, 1952 |